United States Patent
Chmiel et al.

(10) Patent No.: US 9,392,605 B2
(45) Date of Patent: Jul. 12, 2016

(54) CHANGE OF RATE MATCHING MODES IN PRESENCE OF CHANNEL STATE INFORMATION REFERENCE SIGNAL TRANSMISSION

(71) Applicant: Nokia Solutions and Networks Oy, Espoo (FI)

(72) Inventors: Mieszko Chmiel, Wroclaw (PL); Timo E. Roman, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/742,014

(22) Filed: Jun. 17, 2015

(65) Prior Publication Data

US 2015/0341920 A1 Nov. 26, 2015

Related U.S. Application Data

(63) Continuation of application No. 14/160,890, filed on Jan. 22, 2014, now Pat. No. 9,094,978, which is a continuation of application No. 12/803,376, filed on Jun. 24, 2010, now Pat. No. 8,743,799.

(51) Int. Cl.
*H04W 72/04* (2009.01)
*H04L 5/00* (2006.01)
(Continued)

(52) U.S. Cl.
CPC .............. *H04W 72/048* (2013.01); *H04L 5/001* (2013.01); *H04L 5/0048* (2013.01); *H04L 5/1446* (2013.01); *H04W 28/22* (2013.01);
(Continued)

(58) Field of Classification Search
None
See application file for complete search history.

(56) References Cited

U.S. PATENT DOCUMENTS 7,756,548 B2   7/2010  Laroia et al.
8,130,705 B2   3/2012  Bhattacharjee et al. ...... 370/329
(Continued)

FOREIGN PATENT DOCUMENTS

EP   1 509 012 A2   2/2005
EP   1 612 981 A2   1/2006
(Continued)

OTHER PUBLICATIONS

"Final Report of 3GPP TSG RAN WG1 #60bis v1.0.0", MCC Support, WG1 Meeting #61, R1-102601, May 2010, 85 pgs.
(Continued)

*Primary Examiner* — Benjamin H Elliott, IV
(74) *Attorney, Agent, or Firm* — Harrington & Smith

(57) ABSTRACT

In one aspect thereof the exemplary embodiments of this invention provide a method that includes, prior to confirmation that a network access node has correctly acquired capabilities of a user equipment, operating a user equipment with the network access node in accordance with a first rate matching mode and, only after confirmation to the user equipment that the network access node has correctly acquired capabilities of the user equipment, changing the rate matching mode to a second rate matching mode. In an embodiment the first rate matching mode comprises puncturing a downlink shared channel transmission with a set of resource elements, which may be at least one of reference symbols and muted resource elements, and the second rate matching mode comprises rate matching the downlink shared channel around those resource elements that are members of the set of resource elements. Also described are apparatus and computer readable storage medium storing program code that operate in accordance with the method.

20 Claims, 6 Drawing Sheets

PRIOR TO CONFIRMATION THAT A NETWORK ACCESS NODE HAS CORRECTLY ACQUIRED CAPABILITIES OF A USER EQUIPMENT, OPERATING A USER EQUIPMENT WITH THE NETWORK ACCESS NODE IN ACCORDANCE WITH A FIRST RATE MATCHING MODE — 6A

ONLY AFTER CONFIRMATION TO THE USER EQUIPMENT THAT THE NETWORK ACCESS NODE HAS CORRECTLY ACQUIRED CAPABILITIES OF THE USER EQUIPMENT, CHANGING THE RATE MATCHING MODE TO A SECOND RATE MATCHING MODE — 6B

(51) Int. Cl.
*H04L 5/14* (2006.01)
*H04W 28/22* (2009.01)
*H04W 8/22* (2009.01)

(52) U.S. Cl.
CPC ........... *H04W72/042* (2013.01); *H04L 5/0023* (2013.01); *H04L 5/0053* (2013.01); *H04L 5/0091* (2013.01); *H04W 8/22* (2013.01)

(56) References Cited

U.S. PATENT DOCUMENTS

| | | | |
|---|---|---|---|
| 8,165,071 B2 | 4/2012 | Murata et al. | 370/329 |
| 8,743,799 B2 * | 6/2014 | Chmiel | H04L 5/001 370/329 |
| 9,094,978 B2 * | 7/2015 | Chmiel | H04L 5/001 |
| 2004/0009767 A1 | 1/2004 | Lee et al. | |
| 2007/0097935 A1 | 5/2007 | Gorokhov et al. | |
| 2007/0121542 A1 | 5/2007 | Lohr et al. | |
| 2007/0189248 A1 | 8/2007 | Chang et al. | 370/338 |
| 2009/0046672 A1 | 2/2009 | Malladi et al. | 370/336 |
| 2010/0034152 A1 | 2/2010 | Imamura | |
| 2010/0118752 A1 | 5/2010 | Suzuki et al. | 370/311 |
| 2010/0150092 A1 | 6/2010 | Aydin et al. | |
| 2010/0166097 A1 | 7/2010 | Zhou et al. | 375/267 |
| 2010/0260151 A1 | 10/2010 | Onggosanusi et al. | 370/336 |
| 2011/0111781 A1 | 5/2011 | Chen et al. | 455/507 |
| 2011/0199905 A1 | 8/2011 | Pinheiro et al. | 370/235 |
| 2011/0243075 A1 | 10/2011 | Luo et al. | 370/329 |
| 2011/0261833 A1 | 10/2011 | Yang | |
| 2011/0317657 A1 | 12/2011 | Chmiel et al. | 370/331 |
| 2012/0122455 A1 | 5/2012 | Frenger et al. | |
| 2014/0161066 A1 | 6/2014 | Chmiel et al. | 370/329 |

FOREIGN PATENT DOCUMENTS

| | | |
|---|---|---|
| EP | 2 104 257 A2 | 9/2009 |
| EP | 2214445 A1 | 8/2010 |
| JP | 2009/520385 A | 5/2009 |
| JP | 2012/506213 A | 3/2012 |
| RU | 2291591 C2 | 1/2007 |
| RU | 2385540 C2 | 3/2010 |
| WO | WO 2004/110081 A1 | 12/2004 |
| WO | WO 2007/051191 A1 | 5/2007 |
| WO | WO-2009/023835 A1 | 2/2009 |
| WO | WO-2009/093542 A1 | 7/2009 |
| WO | WO-2010/016698 A2 | 2/2010 |
| WO | WO-2010/045288 A2 | 4/2010 |
| WO | WO-2010/049754 A1 | 5/2010 |
| WO | WO 2011/077383 A1 | 6/2011 |

OTHER PUBLICATIONS

"UE Assignment Methods During CIF Configuration", NTT DOCOMO, WG1 Meeting #60bis, R1-102291, Apr. 2010, 5 pgs.
"Performance Evaluation for the Impact of CSI RS on Rel8 PDSCH", ZTE, 3 GPP TSG RAN Working Group 1 Meeting #57bis, R1-092474, May-Jun. 2009, 3 pgs.
"Intra-cell CSI-RS design", Nokia Siemens Networks, 3GPP TSG-RAN WG1 Meeting #61, R1-102956, May 2010, 5 pgs.
"LTE-Advanced Physical Layer REV-090003r1", Matthew Baker, IMT Advanced Evaluation Workshop, Dec. 2009, 48 pgs.
"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0, Jun. 2010, 250 pgs.
"3rd Generation Partnership Project; Technical Specification Group Radio Access Network; Requirements for further advancements for Evolved Universal Terrestrial Radio Access (E-UTRA) (LTE-Advanced) (Release 9)", 3 GPP TR 36.913 V9.0.0, Dec. 2009, 15 pgs.
"3rd Generation Partnership Project; Technical Specification Group Radio Access Network; Feasibility study for Further Advancements for E-UTRA (LTE-Advanced) (Release 9)", 3GPP TR 36.912 V9.3.0, Jun. 2010, 61 pgs.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36,300 V9.3.0, Mar. 2010, 166 pgs.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.11.0, Dec. 2009, 148 pgs.
3GPP TS 36.211 V9.1.0 Mar. 2010 "3rd Generation Partnership Project; Technical Specification Group Radio Access Network; Evolved Universal Terrestrial Radio Access (E-UTRA); Physical Channels and Modulation (Release 9)"; 3GPP; 650, Route des Lucioles—Sophia Antipolis—Valbonne—France; pp. 1-85.
3GPP TS 25.211 V3.12.0, "3rd Generation Partnership Project; Technical Specification Group Radio Access Network; Physical channels and mapping of transport channels onto physical channels (FDD) (Release 1999)", Sep. 2002, 46 pages.
3GPP TS 25.212 V3.11.0, "3rd Generation Partnership Project; Technical Specification Group Radio Access Network; Multiplexing and channel coding (FDD), (Release 1999)", Sep. 2002, 62 pages.
3GPP TS 25.331 V3.21.0, "3rd Generation Partnership Project; Technical Specification Group Radio Access Network; Radio Resource Control (RRC) protocol specification (Release 1999)", Dec. 2004, 879 pages.
Ericsson et al., "Introduction of DC-HSUPA", R1-094359, 3GPP TSG-RAN WG1 #58bis, Miyazaki, Japan, Oct. 12-16, 2009, 107 pages.
3GPP TS 36.300 V9.2.0, "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 9)", Dec. 2009, 178 pages.

* cited by examiner

CHANGE OF RATE MATCHING MODES IN PRESENCE OF CHANNEL STATE INFORMATION REFERENCE SIGNAL TRANSMISSION

CROSS REFERENCE TO RELATED APPLICATION

This patent application is a continuation of U.S. patent application Ser. No.: 14/160,890, filed Jan. 22, 2014, which is a continuation of U.S. patent application Ser. No. 12/803,376, filed Jun. 24, 2010, now U.S. Pat. No. 8,743,799, the contents of which are incorporated by reference herein in their entireties.

TECHNICAL FIELD

The exemplary and non-limiting embodiments of this invention relate generally to wireless communication systems, methods, devices and computer programs and, more specifically, relate to downlink reference signal and data transmission to user equipment, such as Rel-10 (LTE-Advanced) user equipment.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
BW bandwidth
CRS common reference signal
CSI channel state information
CQI channel quality indicator
DCI downlink control information
DL downlink (eNB towards UE)
DM-RS demodulation reference signal (also known as URS)
eNB E-UTRAN Node B (evolved Node B)
EPC evolved packet core
E-UTRAN evolved UTRAN (LTE)
FDMA frequency division multiple access
HSPA high speed packet access
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MCS modulation coding scheme
MIB master information block
MIMO multiple input multiple output
MM/MME mobility management/mobility management entity
NodeB base station
OFDMA orthogonal frequency division multiple access
O&M operations and maintenance
PDCCH physical downlink control channel
PDCP packet data convergence protocol
PDSCH physical downlink shared channel
PHY physical (layer 1, L1)
PMI pre-coding matrix indicator
PRB physical resource block
RACH random access channel
RE resource element
Rel release
RI rank indicator
RLC radio link control
RRC radio resource control (layer 3, L3)
RRM radio resource management
RS reference signal
SGW serving gateway
SIB system information block
TM transmission mode
SC-FDMA single carrier, frequency division multiple access
UE user equipment, such as a mobile station, mobile node or mobile terminal
UL uplink (UE towards eNB)
UMTS universal mobile telecommunications system
UPE user plane entity
URS UE-specific reference signal
UTRAN universal terrestrial radio access network One modem communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1A reproduces FIG. 4.1 of 3GPP TS 36.300 V8.11.0, and shows the overall architecture of the EUTRAN system (Rel-8). Reference can also be made to FIG. 1B. The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a Si interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation (CA), where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

In the context of LTE-A DL MIMO enhancements it has been decided to introduce two types of downlink reference signals. The first is referred to as DM-RS. DM-RS is a precoded UE-specific reference signal used for data detection/demodulation for up to eight spatial layers. The second DL reference signal is referred to as CSI-RS. CSI-RS is a cell-specific reference signal used for CQI/PMI/RI determination and channel sounding. CSI-RS has a lower density in time/frequency as compared to, for example, the CRS that is specified for use in Rel-8.

Reference can be made to 3GPP TSG-RAN Working Group 1 Meeting #57bis, R1-092474, Los Angeles, USA, 29 Jun.-8 May, 2009, Agenda Item: 15.1, Source: ZTE, Title: "Performance Evaluation for the Impact of CSI RS on Re18 PDSCH". In this document the impact of CSI-RS insertion on the LTE Rel-8 PDSCH is discussed. It is said that replacement of Rel-8 PDSCH RE for LTE-A CSI-RS transmission may harm the Rel-8 PDSCH performance because the legacy UE would treat the corresponding REs as data and include them into the PDSCH channel decoding This situation is said to be generally worse than decoding with an erasure. Based on simulation results it was concluded that when the CSI-RS transmission interval is shorter than 5 ms the performance impact to the Rel-8 PDSCH is obvious in the case of a high modulation order or coding rate. To keep good performance for a 2 ms or 5 ms interval the CSI-RS should have low frequency density, e.g., less than 6 RE. Other remedies include MCS adjustment for a Rel-8 PDSCH packet when a RB has CSI-RS inserted. It was also noted that a uniform distribution of CSI-RS causes a smaller Rel-8 PDSCH performance loss than continuous distribution.

It has been agreed in 3GPP RAN1 that the CSI-RS density is one RE per antenna port per PRB per subframe. Two examples of CSI-RS subframe patterns are shown in FIG. 1C. CSI-RS is not necessarily present in each DL subframe, and it can be configured with a duty cycle of, e.g., 2, 5 or 10 ms. Reference in this regard can be made to, for example, 3GPP TSG-RAN WG1 Meeting #61, R1-102956, Montreal, Canada, May 10-14, 2010, Agenda item: 6.3.2.1, Source: Nokia, Nokia Siemens Networks, Title: "Intra-cell CSI-RS design".

During RAN1 #60bis it was agreed that rate matching is to be applied to the CSI-RS locations for the Rel-10 UE, and that RE mapping of the PDSCH of the serving cell avoids CSI-RS of the serving cell. Reference in this regard can be made to 3GPP TSG RAN WG1 Meeting #61, R1-102601, Montreal, Canada, 10-14 May 2010, Agenda item 3, Title: Final Report of 3GPP TSG RAN WG1 #60bis v1.0.0, (Beijing, China, 12-16Apr. 2010), Source: MCC Support.

SUMMARY

The foregoing and other problems are overcome, and other advantages are realized, by the use of the exemplary embodiments of this invention.

In a first aspect thereof the exemplary embodiments of this invention provide a method that comprises, prior to confirmation that a network access node has correctly acquired capabilities of a user equipment, operating a user equipment with the network access node in accordance with a first rate matching mode and, only after confirmation to the user equipment that the network access node has correctly acquired capabilities of the user equipment, changing the rate matching mode to a second rate matching mode.

In another aspect thereof the exemplary embodiments of this invention provide an apparatus that comprises a processor and a memory including computer program code. The memory and computer program code are configured to, with the processor, cause the apparatus at least to, prior to confirmation that a network access node has correctly acquired capabilities of a user equipment, operate a user equipment with the network access node in accordance with a first rate matching mode and, only after confirmation to the user equipment that the network access node has correctly acquired capabilities of the user equipment, change the rate matching mode to a second rate matching mode.

DETAILED DESCRIPTION

Related to the background discussion above it can be noted that for Rel-8/9 UEs (terminals), which are not aware of the presence of CSI-RS, the PDSCH RE mapping cannot avoid the CSI-RS locations of the serving cell. Therefore, in a case where there is PDSCH transmission to a Rel-8/9 terminal in a subframe containing the CSI-RS, the CSI-RS REs will puncture (override) the Rel-8/9 PDSCH REs without any Rel-8/9 terminal awareness of the source of the additional PDSCH interference experienced by the UE decoder.

The eNB may take actions in order to mitigate such interference. For example, the eNB may avoid scheduling Rel-8/9 UEs in subframes containing CSI-RS, or it may adjust (step down) the MCS level for affected UEs in order to overcome the interference due to the CSI-RS. That is, the eNB may cause the Rel-8/9 UE to operate with a more robust MCS in order to alleviate to some degree the additional interference experienced by the UE due to the presence of the CSI-RS.

Furthermore, and related to the exemplary embodiments of this invention, it can be noted that in the Rel-8/9 version of the LTE specifications there is no explicit signaling mechanism that would inform the UE at which exact point in time the network has correctly acquired its radio capabilities and knows the Release information (e.g., Rel-8 or Rel-9) of the UE.

Figure 3:
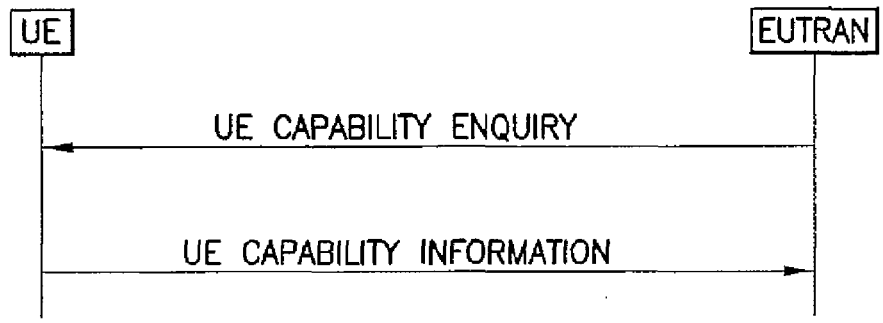
FIG. 3 illustrates a UE capability transfer procedure and reproduces FIG. 5.6.3.1-1 of 3GPP TS 36.331.
Figure 5:
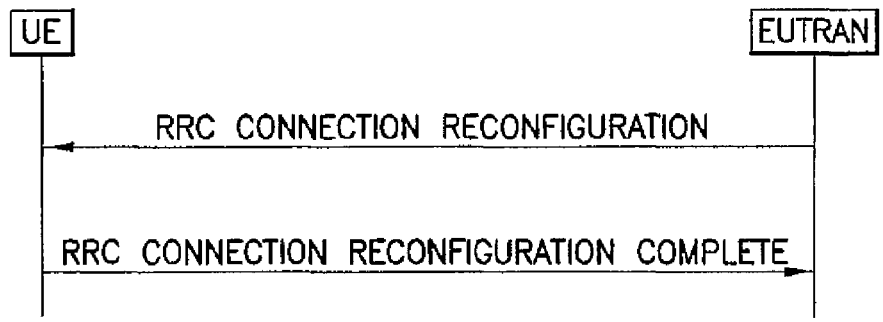
FIG. 5 depicts an RRC connection reconfiguration procedure (successful) and reproduces FIG. 5.3.5.1-1 of 3GPP TS 36.331.

FIG. 3 shows the UE capability transfer procedure described in section 5.6.3 of 3GPP TS 36.331 V9.3.0 (2010-06) Technical Specification 3rd Generation Partnership Project; Technical Specification Group Radio Access Network; Evolved Universal Terrestrial Radio Access (E-UTRA); Radio Resource Control (RRC); Protocol specification (Release 9). FIG. 5 shows the UE RRC connection reconfiguration procedure described in section 5.3.5 of 3GPP TS 36.331 V9.3.0.

As is shown in FIG. 3 the UE capability transfer is not higher layer acknowledged (and due to L1 errors it can fail without the knowledge of the UE that the failure has occurred). If such an error event does occur a Rel-10 UE entering a cell with CSI-RS transmission enabled could potentially experience interference from the CSI-RS just as a Rel-8/9 UE. In addition the UE can perform rate de-matching around the CSI-RS while the eNB, being unaware of the Rel-10 capability of the UE due to the failure of the capability transfer signaling, would continue rate matching the PDSCH as if the UE was Rel-81-9 capable. This could result in a failure of transmission.

For example, the eNB can request the capabilities of the UE and, after a successful UE capability transfer procedure, use the RRC connection reconfiguration procedure (FIG. 5) to configure the UE into a Rel-9 specific (or Rel-10 specific) Transmission Mode (TM) 8 (or TM x, where x≥8, which is expected to be part of Rel-10 specifications). This series of events would be an implicit indication to the UE that the network has correctly acquired its UE radio capabilities and that the network knows the release of the UE. On the other hand, if UE capability transfer fails (FIG. 3) it is possible that the failed capability transfer can be followed by the RRC connection reconfiguration procedure (FIG. 5) for configuring the UE into, e.g., TM 0 or 1. These exemplary TMs are release-independent and can be operable (with some restrictions) without network knowledge of the actual radio capabilities/release of the UE. After such a series of events has occurred the UE cannot be assured that the network has actually and accurately acquired the UE radio capabilities. That is, the receipt by the UE of the RRC connection reconfiguration procedure that configures the UE into, e.g., TM 0 or 1 does not guarantee to the UE that the network has actually previously acquired the UE configuration parameters.

By way of background to the foregoing discussion, information bits to be transmitted on the PDSCH are turbo coded and then circular buffer rate matched. That is, depending on the number of available REs (symbols) the correct number of coded bits is taken from the circular buffer (CB) for transmission (for code rate of ⅓ it is the entire CB, for a code rate >⅓ a subset of the CB bits is transmitted, for a code rate <⅓ CB bits are repeated by wrapping around the circular buffer). Thus, "rate matching around the CSI RS" generally means that both the UE and the eNB know that certain REs (symbols) are not available for the PDSCH and this is taken into account in the rate matching process. Puncturing the PDSCH by CSI-RS means that in the rate matching process the CSI-RS REs (symbols) are assumed to be available for the PDSCH, but in the next step the PDSCH symbols in the CSI-RS REs are overridden by the CSI-RS symbols. In the case of both puncturing and rate matching the same number of PDSCH REs is transmitted, but rate matching has better performance, especially for high code rates.

Reference in this regard can be made to FIG. 4 (discussed in further detail below), where the circular buffer is not shown for simplicity and generality. That is, FIG. 4 is an example of rate matching and puncturing for one exemplary CSI-RS pattern, where the left hand side assumes DM-RS-based PDSCH transmission while the right hand side assumed CRS-based PDSCH transmission.

The above-noted agreement on rate matching around CSI-RS is justified from a performance point of view. However, considering the foregoing scenarios it creates at least the following problem.

The eNB should use PDSCH rate matching around CSI-RS when it knows that a given PDSCH transmission is targeting a Rel-10 UE. However, and as was made apparent above, the point in time at which the UE knows that the eNB has correctly acquired its UE radio capabilities (and thus has knowledge of the release of the UE) is not well defined. The eNB can perform a reconfiguration of the CSI-RS (e.g., change the number of antenna ports on the fly, motivated by energy savings for example). However, increasing the number of CSI-RS ports on the fly can lead to additional puncturing of the PDSCH and increased interference at the UE, and hence a loss in performance.

Alternatively, decreasing the number of CSI-RS ports can create muted REs, assuming that PDSCH stays rate-matched around the set of CSI-RS REs prior to the change, which in turn reduces the overall spectral efficiency. In a case where the eNB activates/de-activates RE muting or modifies RE muting parameters (e.g., by an increase or decrease of the reuse factor) for inter-cell CSI measurements, then rate matching of the PDSCH around the set of muted REs should take place to avoid performance degradations, similar to the case of a change on the fly of the number of CSI-RS ports.

From the perspective of the exemplary embodiments of this invention muted REs can be considered to have the same impact as the CSI-RS REs. That is, they either (and possibly in some subframes together with CSI-RS) cause puncturing of the PDSCH or the PDSCH is rate matched around muted REs. In general, a muted RE is an RE with zero power from a certain cell, and the presence of muted REs can improve inter-cell measurements of a UE on CSI-RS for the purpose of DL transmission schemes that involve participation of more than one cell.

In the case where there is no common understanding between the UE and the eNB on what rate matching is used for the PDSCH transmission then it follows that the PDSCH transmission cannot be correctly decoded by the UE.

The exemplary embodiments of this invention address and solve these various problems and difficulties. It should be noted that the rate matching-related problem discussed above is applicable to all transmission modes (and not only to Rel-10 specific TMs).

Figure 1A:
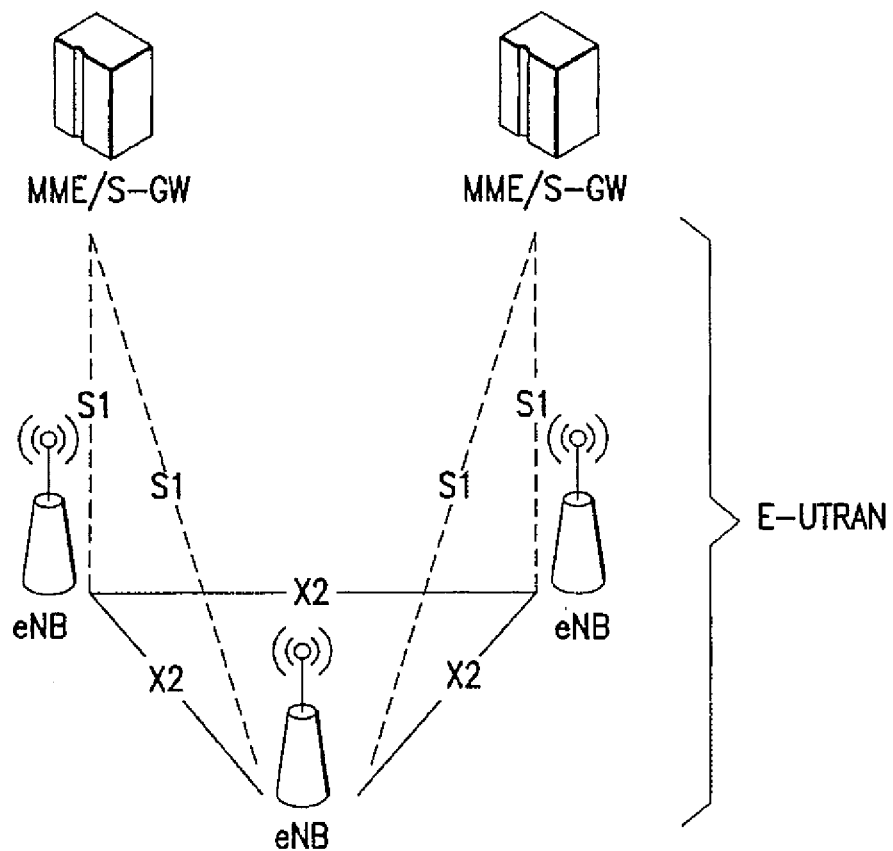
FIG. 1A reproduces FIG. 4.1 of 3GPP TS 36.300, and shows the overall architecture of the EUTRAN system.
Figure 1B:
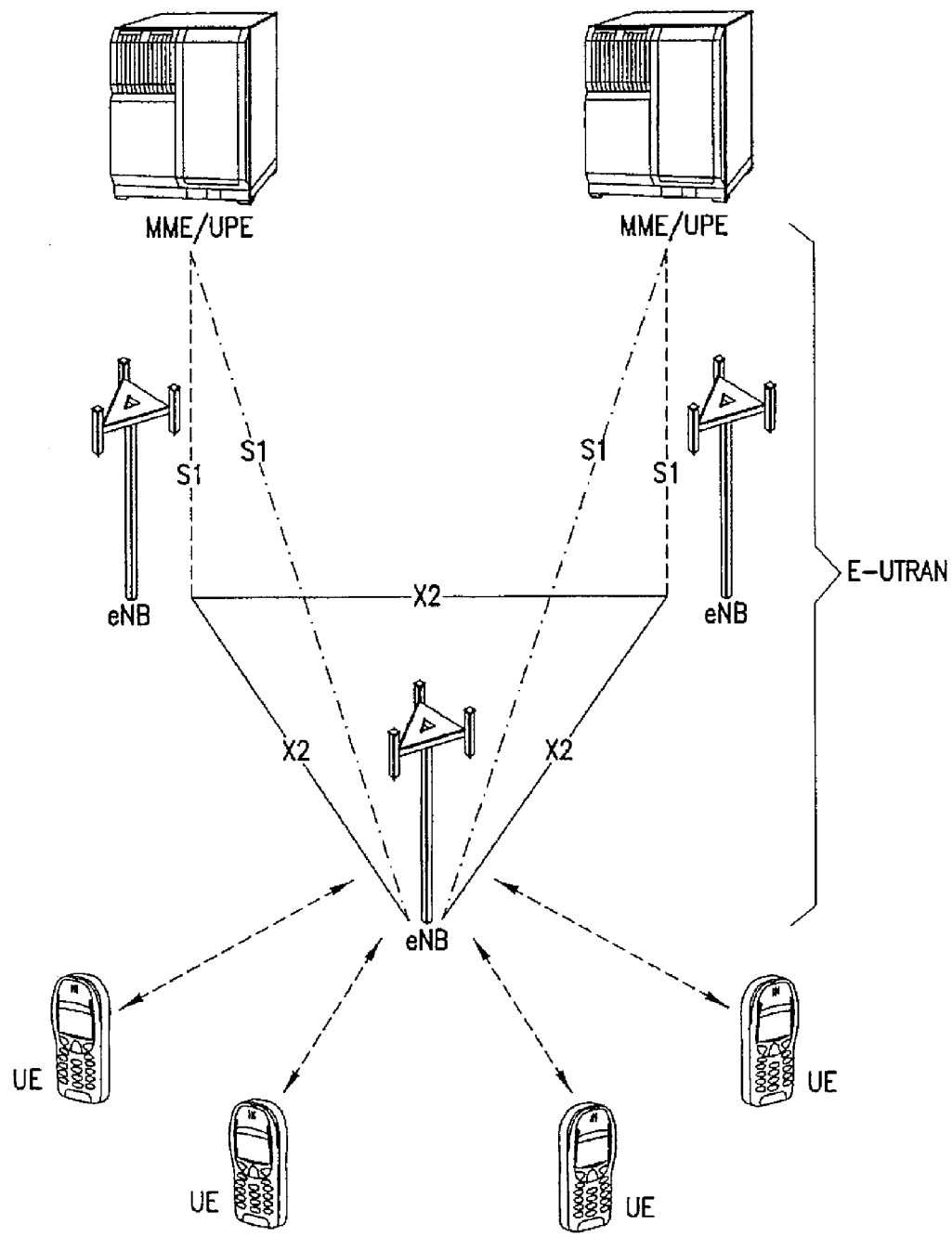
FIG. 1B presents another view of the EUTRAN system.
Figure 2:
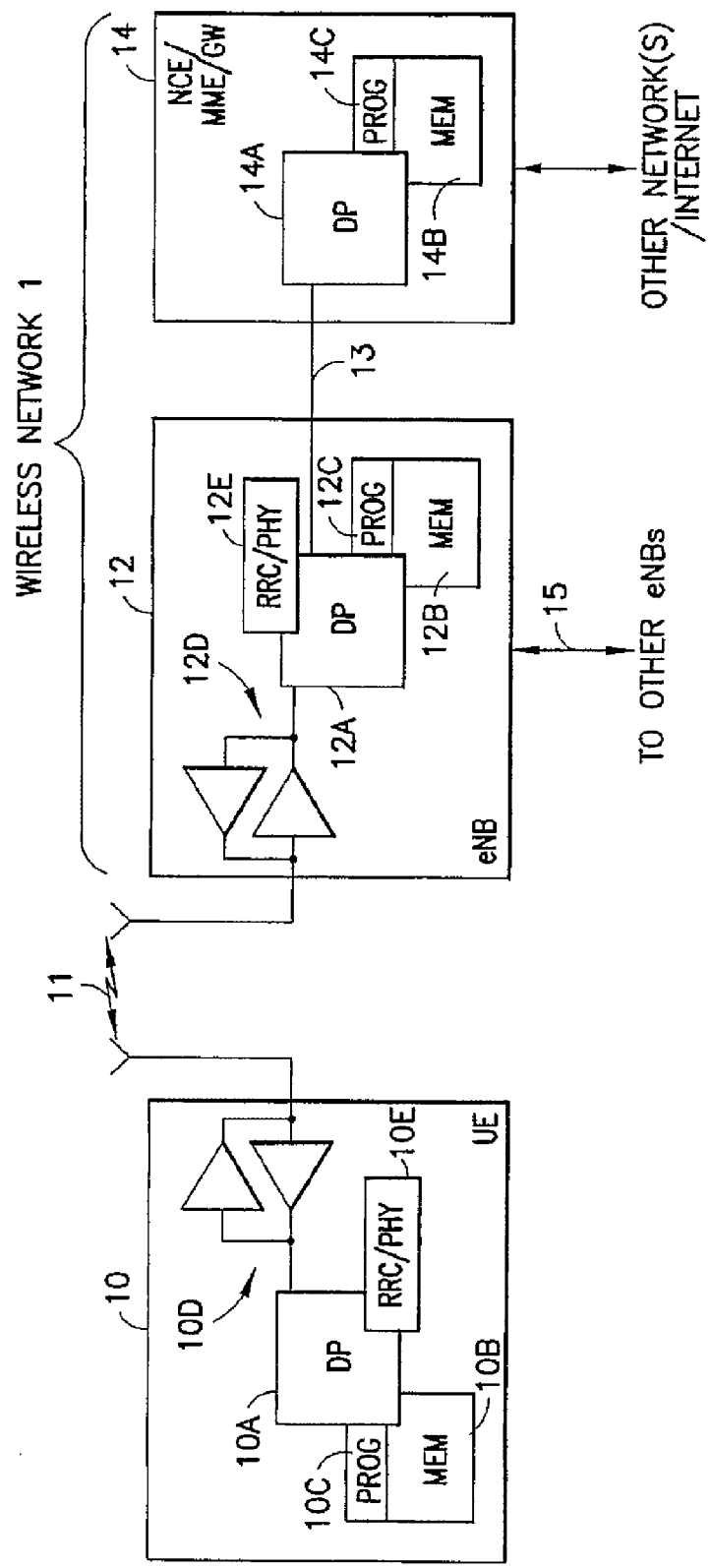
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and suitable RF transceivers 12D for communication with the UE 10 via a plurality of antenna ports and antennas when multiple input/multiple output (MIMO) operation is in use. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include RRC/PHY (L1) functions 10E, and the eNB 12 may be assumed to include a corresponding RRC/PHY (L1) functions 12E. The eNB 12 RRC/PHY (L1) functions 12E can be assumed to operate to provide the CSI-RS puncturing of the PDSCH, rate matching and related operations, as well as to perform RRC signaling to and from the UE 10, and are enhanced for operation with the exemplary embodiments of this invention as described in further detail below. The UE 10 RRC/PHY (L1) functions 10E can be assumed to operate to receive and interpret the CSI-RS puncturing of the PDSCH, to perform rate de-matching and related operations, as well as to perform RRC signaling to and from the eNB 12, and are enhanced for operation with the exemplary embodiments of this invention as described in further detail below.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention, before the UE 10 has knowledge that the eNB 12 has correctly acquired the radio capabilities of the UE 10 (and thus the release (e.g., Rel-8, Rel-10) of the UE), the PDSCH transmission to the UE 10 is punctured by CSI-RS REs and both the eNB 12 and the UE 10 (i.e., the UE 10 and eNB 12 RRC/PHY (L1) functions 10E, 12E) use this assumption when transmitting/rate matching and receiving/de-rate matching, respectively) whenever PDSCH and CSI-RS happen to be transmitted in the same sub-frame.

After the UE 10 has gained the knowledge that the eNB 12 has correctly acquired the radio capabilities of the UE the PDSCH transmission to the UE is rate matched around CSI-RS REs.

The point in time when the rate matching mode is changed as above is defined by explicit downlink signaling, or by implicit signaling/rule.

Describing the exemplary embodiments in further detail, the implementation of methods and apparatus is considered to have at least two aspects.

PDSCH rate matching around CSI-RS and PDSCH puncturing by CSI-RS are shown in FIG. 4. These two modes can be defined by specifying which set of REs is available for PDSCH transmission (in 3GPP TS 36.211). Additionally, if some REs are muted (not shown in FIG. 4) to facilitate inter-cell or interference measurements, these muted REs are treated in the same ways as CSI-RS REs, i.e., the PDSCH rate matching is also performed around the muted REs or the muted REs puncture PDSCH.

Figure 1C:
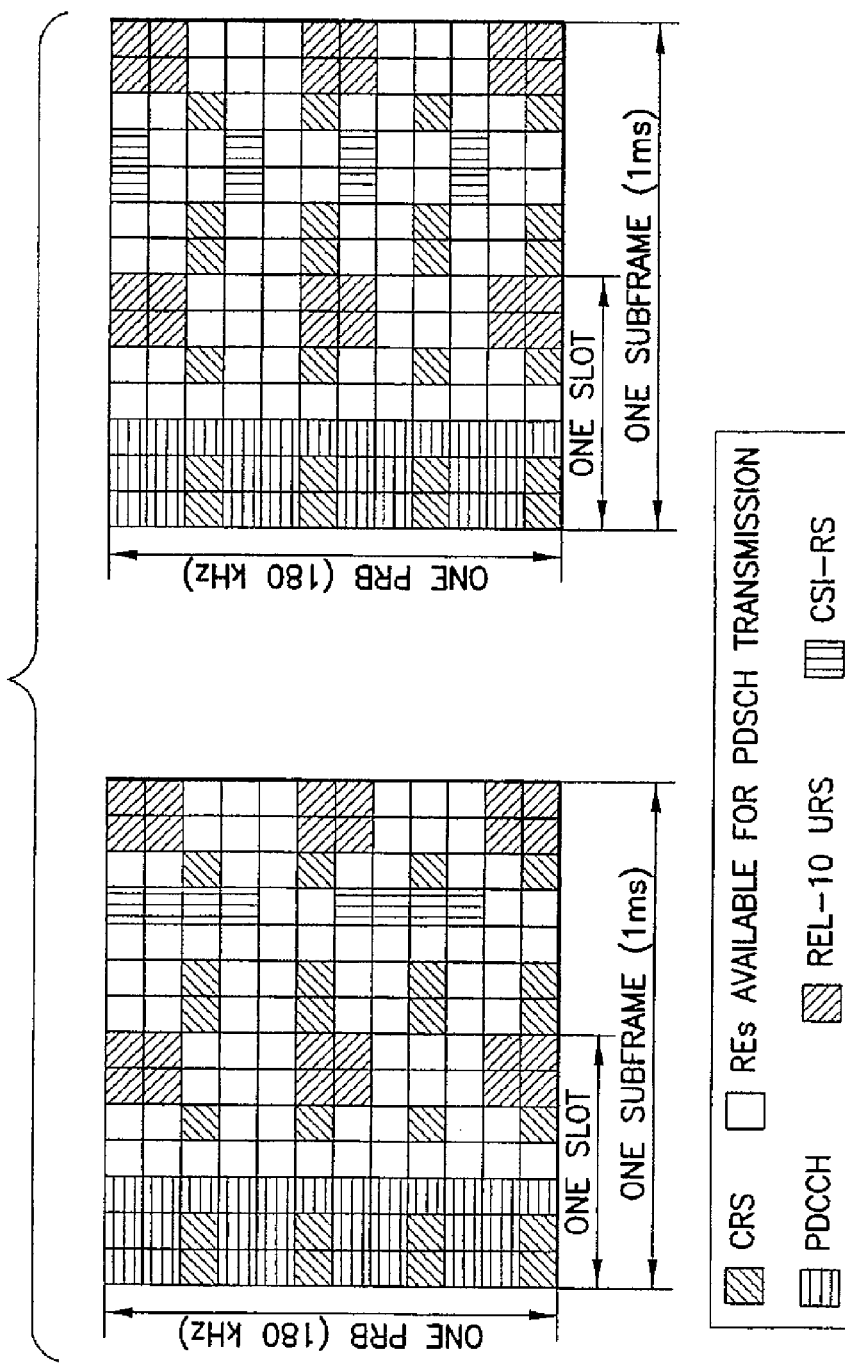
FIG. 1C shows examples of intra-cell CSI-RS patterns for 8TX, normal CP.
Figure 4B:
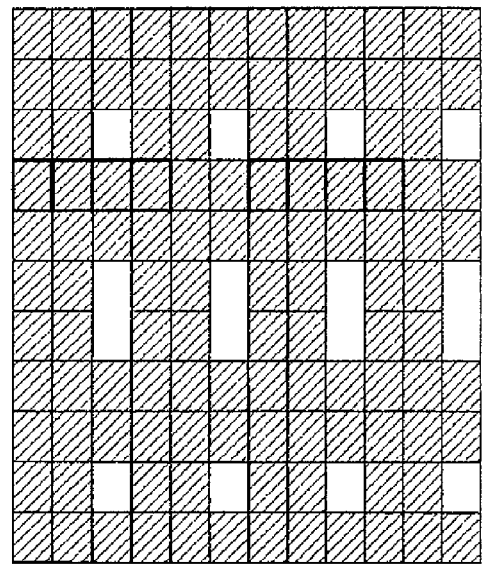
FIGS. 4A and 4B (collectively referred to herein as FIG. 4) present an example of rate matching and puncturing for one exemplary and non-limiting CSI-RS pattern for DM-RS-based PDSCH transmission and CRS-based PDSCH transmission, respectively.
Figure 4A:
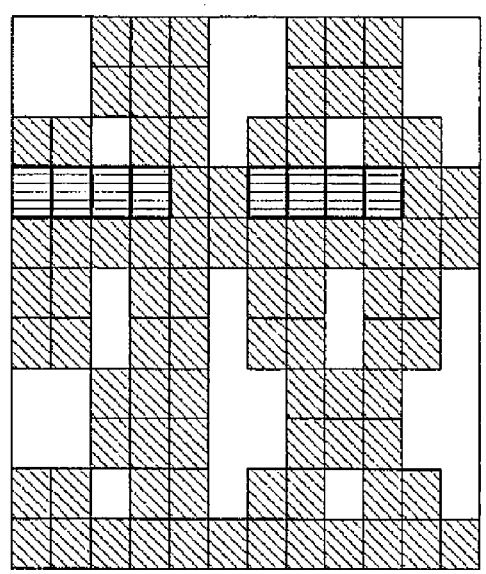

FIG. 4 depicts an example of rate matching and puncturing for one exemplary CSI-RS pattern. In FIG. 4 PDCCH, CRS, UE-specific RS and CSI-RS are not shown for simplicity (compare with FIG. 1C). In FIG. 4 the left hand side (FIG. 4A) assumes DM-RS-based PDSCH transmission while the right hand side (FIG. 4B) assumes CRS-based PDSCH transmission.

In the second aspect, the definition of the point when the rate matching mode is changed can be accomplished, for example, by explicit signaling implemented as RRC (L3) signaling. In this case there can either be a new additional DL confirmation message added in the UE 10 capability transfer procedure (FIG. 3), or a new parameter can be added in the RRC Connection Reconfiguration message (FIG. 5) defining the CSI-RS and/or RE muting related rate matching mode. The explicit signaling can also be accomplished by DCI (L1/L2) signaling, such as by using one bit (or by joint coding with some other DCI field) in Rel-10 DL grants indicating the rate matching mode.

In the second aspect the definition of the point when the rate matching mode is changed can be accomplished through the use of an implicit rule (possibly in combination with signaling). One exemplary implicit rule can be as follows.

Rule: a Rel-10 network supporting CSI-RS, including potentially the possibility for RE muting, uses the RRC Connection Reconfiguration procedure (FIG. 5) only after the Rel-10 network has correctly acquired the radio capabilities of the UE 10. The use of the RRC Connection Reconfiguration procedure is thus interpreted by the UE 10 as an implicit indication that the CSI-RS related rate matching mode is changed. More specifically, due to the asynchronous nature and/or possible errors, the eNB 12 begins to rate match around CSI-RS for a given UE 10 only after it has received the RRC Connection Reconfiguration Complete message from this UE 10.

An alternative embodiment is that the UE 10 applies the rate matching mode change in line with RRC procedure delay rules with some residual configuration ambiguity, or synchronized RRC reconfiguration is used via intra-cell handover to avoid the residual configuration ambiguity.

More specifically, in Rel-8 and Rel-9 RRC Connection Reconfiguration, and due to RRC procedure delay, there can be some ambiguity between the eNB and UE (e.g., of a few ms) about when the new configuration is applied at the UE 10. This ambiguity is either accepted or, if it is not acceptable, an intra-cell handover is used as a way to ensure a synchronous reconfiguration in the UE (no time ambiguity). Reference can be made to, for example, section 11.2, "Processing delay requirements for RRC procedures", of the above referenced 3GPP TS 36.331, as well as to section 5.3.5.4, "Reception of an RRCConnectionReconfiguration including the mobility-ControlInfo by the UE (handover)" of 3GPP TS 36.331. Additional general information concerning intra-cell handover (in a different context) can be found in 3GPP TSG RAN WG1 Meeting #60bis, R1-102291, Beijing, China, Apr. 12 16, 2010, Source: NTT DOCOMO, Title: UE Assignment Methods During CIF Configuration, specifically in the section entitled "Method 2: Employ time-synchronization using RACH (e.g., intra-eNodeB handover)".

Before the eNB 12 applies the changed rate matching mode for a Rel-10 UE 10, if the UE knows the CSI-RS (and potentially RE muting if specified/activated) configuration, the UE 10 can mitigate some of the puncturing interference (e.g., for paging, RACH response and system information transmission). Therefore, further in accordance with the exemplary embodiments the CSI-RS (and RE muting) configuration is transmitted in System Information in a SIB (or in the MIB). Inclusion of this information into a SIB (MIB) is desirable at least from the point of view of changing the number of CSI-RS antenna ports and/or the muting parameters on-the-fly. In this case similarities are achieved with the considered specification and implementation aspects of on-the-fly CRS antenna port number change. However, the exemplary embodiments are not precluded in a case where the CSI-RS (and RE muting) configuration is provided via dedicated RRC signaling.

Based on the foregoing, and for the purposes of describing the exemplary embodiments of this invention, the first rate matching mode can comprise puncturing the downlink shared channel transmission with a set of resource elements, and the second rate matching mode can comprise rate matching the downlink shared channel around those resource elements that are members of the set of resource elements. The set of resource elements can include, for example, one or more REs containing CSI-RS symbols, as well as possibly one or more muted REs.

There are a number of technical effects, advantages and benefits that can be realized by the use of the exemplary embodiments of this invention. For example, there is no mismatch between the eNB 12 and the UE 10 with respect to rate matching mode is used in presence of CSI-RS transmission and/or RE muting. Further, the use of optimized rate matching around CSI-RS and/or muted REs is applied at the earliest feasible time. Further, the exemplary embodiments can be implemented with very little or no DL signaling overhead. In addition, the interference due to CSI-RS puncturing can be mitigated by the UE 10 early in the RRC IDLE state, or soon after entering the RRC CONNECTED state.

Figure 6:
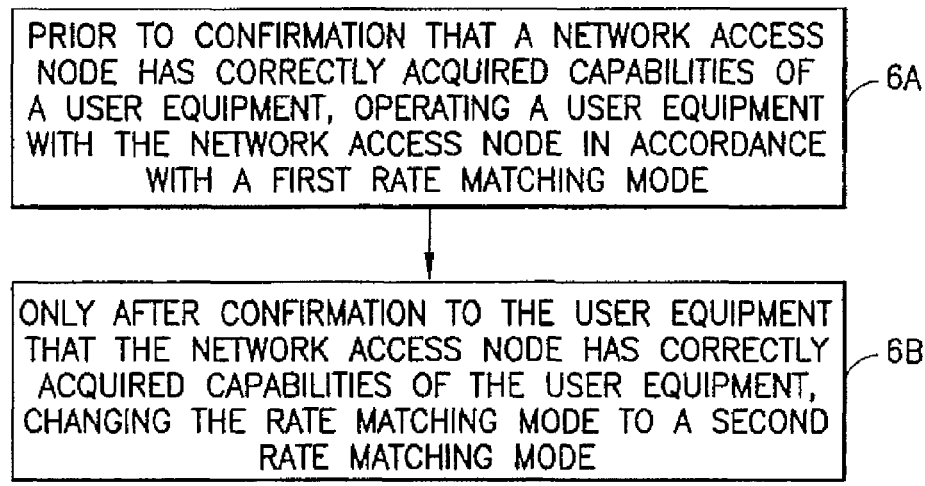
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step performed, prior to confirmation that a network access node has correctly acquired capabilities of a user equipment, of operating a user equipment with the network access node in accordance with a first rate matching mode. At Block 6B there is a step performed, only after confirmation to the user equipment that the network access node has correctly acquired capabilities of the user equipment, of changing the rate matching mode to a second rate matching mode.

In the method of FIG. 6, where the first rate matching mode comprises puncturing a downlink shared channel transmission with a set of resource elements, and where the second rate matching mode comprises rate matching the downlink shared channel around those resource elements that are members of the set of resource elements.

In the method as in the preceding paragraph, where the set of resource elements can contain at least one of reference symbols and muted resource elements.

In the method of the preceding paragraph, where the reference symbols are channel state information reference symbols transmitted in support of multiple input multiple output operation of the network access node and the user equipment.

In the method of FIG. 6, where the confirmation is achieved by one of explicitly based on signaling, implicitly based on signaling and application of a rule.

In the method of the preceding paragraph, where the confirmation is achieved explicitly based on radio resource control signaling using one of a confirmation message that comprises part of a radio resource control capability transfer procedure, or a parameter that comprises part of a radio resource control connection reconfiguration message defining the rate matching mode.

In the method of the preceding paragraphs, where the confirmation is achieved explicitly based on downlink control information signaling using at least one bit to indicate the rate matching mode.

In the method of the preceding paragraphs, where the confirmation is achieved implicitly based on execution of a radio resource control connection reconfiguration signaling procedure, and where the rule comprises the network access node initiating rate matching around the reference symbols for the user equipment only after it has received a radio resource control connection reconfiguration complete message from the user equipment.

In the method of FIG. 6, where the confirmation is achieved implicitly based on execution of a radio resource control connection reconfiguration, where the rate matching mode is changed in compliance with radio resource control procedure delay rules and includes residual configuration ambiguity, or is changed with a synchronized radio resource control reconfiguration procedure using an intra-cell handover of the user equipment to substantially eliminate residual configuration ambiguity.

In the method of the preceding paragraphs, where the method further comprises transmitting to the user equipment an indication of a reference signal configuration in a system information block, or by using dedicated radio resource control signaling.

In the method of the preceding paragraphs, further comprising transmitting to the user equipment a configuration of resource elements that are muted in a system information block, or by using dedicated radio resource control signaling.

The exemplary embodiments also pertain to a non-transitory computer-readable medium that contains software program instructions, where execution of the software program instructions by at least one data processor results in performance of operations that comprise execution of the method of any one of the preceding paragraphs.

The exemplary embodiments also pertain in part to a non-transitory computer-readable medium that contains software program instructions, where execution of the software program instructions by at least one data processor results in performance of operations that comprise execution of the method as above and shown in FIG. 6.

The various blocks shown in FIG. 6 may be viewed as method steps, and/or as operations that result from operation of computer program code, and/or as a plurality of coupled logic circuit elements constructed to carry out the associated function(s).

The exemplary embodiments thus also pertain at least in part to an apparatus that comprises a processor and a memory including computer program code, where the memory and computer program code are configured to, with the processor, cause the apparatus at least to, prior to confirmation that a network access node has correctly acquired capabilities of a user equipment, operate a user equipment with the network access node in accordance with a first rate matching mode and, only after confirmation to the user equipment that the network access node has correctly acquired capabilities of the user equipment, change the rate matching mode to a second rate matching mode.

The exemplary embodiments thus also pertain at least in part to an apparatus that comprises means, operable prior to confirmation that a network access node has correctly acquired capabilities of a user equipment, for operating a user equipment with the network access node in accordance with a first rate matching mode. The apparatus further comprises means, operable only after confirmation to the user equipment that the network access node has correctly acquired capabilities of the user equipment, for changing the rate matching mode to a second rate matching mode.

In general, the various exemplary embodiments may be implemented in hardware or special purpose circuits, software, logic or any combination thereof For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the (UTRAN-LTE-A) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and signal elements (e.g., CSI-RS, CRS, etc.) are not intended to be limiting in any respect, as these parameters and signal elements may be identified by any suitable names. Further, the various names assigned to different channels (e.g., PDSCH, PDCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   prior to confirmation that a network access node has correctly acquired capabilities of a user equipment, operating the user equipment with the network access node in accordance with a first rate matching mode on a downlink channel from the network node to the user equipment; and
   only after confirmation to the user equipment that the network access node has correctly acquired capabilities of the user equipment, operating the user equipment with the network access node in accordance with a second rate matching mode on the downlink channel,
   where the confirmation is achieved based on execution of a radio resource control connection reconfiguration signaling procedure and based on application of a rule, where the rule comprises the network access node applying rate matching around reference symbols for the user equipment only after it has received a radio resource control connection reconfiguration complete message from the user equipment.

2. The method of claim 1, where the first rate matching mode comprises puncturing a transmission on the downlink channel with a set of resource elements, and where the second rate matching mode comprises rate matching the downlink channel around those resource elements that are members of the set of resource elements.

3. The method of claim 2, where the set of resource elements contains at least one of reference symbols and muted resource elements.

4. The method of claim 1, where the confirmation is achieved explicitly based on one of radio resource control signaling using one of a confirmation message that comprises part of a radio resource control capability transfer procedure, and a parameter that comprises part of a radio resource control connection reconfiguration message defining the rate matching mode.

5. The method of claim 3, where the reference symbols are channel state information reference symbols transmitted in support of multiple input multiple output operation of the network access node and the user equipment.

6. The method of claim 1, where the confirmation is achieved explicitly based on downlink control information signaling using at least one bit to indicate the rate matching mode.

7. The method of claim 1, wherein an indication of a reference signal configuration is transmitted to the user equipment in a system information block, or by using dedicated radio resource control signaling.

8. The method of claim 1, wherein a configuration of resource elements that are muted is transmitted to the user equipment in a system information block, or by using dedicated radio resource control signaling.

9. A non-transitory computer-readable medium that contains software program instructions, where execution of the software program instructions by at least one data processor results in performance of operations that comprise execution of the method of claim 1.

10. A method comprising:
    prior to confirmation that a network access node has correctly acquired capabilities of a user equipment, operating the user equipment with the network access node in accordance with a first rate matching mode on a downlink channel from the network node to the user equipment; and
    only after confirmation to the user equipment that the network access node has correctly acquired capabilities of the user equipment, operating the user equipment with the network access node in accordance with a second rate matching mode on the downlink channel,
    where the confirmation is achieved based on the use of a radio resource control connection reconfiguration, where the rate matching mode is changed in compliance with radio resource control procedure delay rules and includes residual configuration ambiguity, or is changed with a synchronized radio resource control reconfiguration procedure using an intra-cell handover of the user equipment to substantially eliminate residual configuration ambiguity.

11. An apparatus, comprising:
    a processor; and
    a memory including computer program code, where the memory and computer program code are configured to, with the processor, cause the apparatus at least to,
    prior to confirmation that a network access node has correctly acquired capabilities of a user equipment, operate the user equipment with the network access node in accordance with a first rate matching mode on a downlink channel from the network node to the user equipment; and
    only after confirmation to the user equipment that the network access node has correctly acquired capabilities of the user equipment, operating the user equipment with the network access node in accordance with a second rate matching mode on the downlink channel,
    where the confirmation is achieved based on execution of a radio resource control connection reconfiguration signaling procedure and based on application of a rule, where the rule comprises the network access node applying rate matching around reference symbols for the user equipment only after it has received a radio resource control connection reconfiguration complete message from the user equipment.

12. The apparatus of claim 11, where the first rate matching mode comprises puncturing a transmission on the downlink channel with a set of resource elements, and where the second rate matching mode comprises rate matching the downlink channel around those resource elements that are members of the set of resource elements.

13. The apparatus of claim 12, where the set of resource elements contains at least one of reference symbols and muted resource elements.

14. The apparatus of claim 13, where the reference symbols are channel state information reference symbols transmitted in support of multiple input multiple output operation of the network access node and the user equipment.

15. The apparatus of claim 11, where the confirmation is achieved explicitly based on one of radio resource control signaling using one of a confirmation message that comprises part of a radio resource control capability transfer procedure, and a parameter that comprises part of a radio resource control connection reconfiguration message defining the rate matching mode.

16. The apparatus of claim 11, where the confirmation is achieved explicitly based on downlink control information signaling using at least one bit to indicate the rate matching mode.

17. The apparatus as in claim 11, wherein an indication of a reference signal configuration is transmitted to the user equipment in a system information block, or by using dedicated radio resource control signaling.

18. The apparatus as in claim 11, wherein a configuration of resource elements that are muted is transmitted to the user equipment in a system information block, or by using dedicated radio resource control signaling.

19. The apparatus as in claim 11, where the apparatus is configured to operate with long term evolution-advanced protocols and specifications.

20. An apparatus, comprising:
   a processor; and
   a memory including computer program code, where the memory and computer program code are configured to, with the processor, cause the apparatus at least to,
   prior to confirmation that a network access node has correctly acquired capabilities of a user equipment, operate the user equipment with the network access node in accordance with a first rate matching mode on a downlink channel from the network node to the user equipment; and
   only after confirmation to the user equipment that the network access node has correctly acquired capabilities of the user equipment, operating the user equipment with the network access node in accordance with a second rate matching mode on the downlink channel,
   where the confirmation is achieved based on execution of a radio resource control connection reconfiguration, where the rate matching mode is changed in compliance with radio resource control procedure delay rules and includes residual configuration ambiguity, or is changed with a synchronized radio resource control reconfiguration procedure using an intra-cell handover of the user equipment to substantially eliminate residual configuration ambiguity.

* * * * *